United States Patent [19]

Ivers et al.

[11] 4,187,613
[45] Feb. 12, 1980

[54] JIG FOR PRECISE MEASUREMENT OF PANELS FOR GEODESIC

[75] Inventors: Robert P. Ivers; Mark J. Thimsen, both of Minnetonka, Minn.

[73] Assignee: Geodesic Shelters, Inc., Minnetonka, Minn.

[21] Appl. No.: 936,633

[22] Filed: Aug. 24, 1978

[51] Int. Cl.² .......................... G01B 3/14; G01B 3/38
[52] U.S. Cl. ............................... 33/174 G; 33/DIG. 9
[58] Field of Search ....... 33/174 G, 1 G, 98, DIG. 9, 33/194, 174 R

[56] References Cited

U.S. PATENT DOCUMENTS

| | | | |
|---|---|---|---|
| 738,224 | 9/1903 | Morse | 33/460 |
| 1,046,362 | 12/1912 | Adams | 33/460 |
| 1,559,386 | 10/1925 | Valentine | 33/174 G |
| 1,849,128 | 3/1932 | Wood | 33/463 |
| 2,093,048 | 9/1937 | Ike | 33/453 |
| 2,460,713 | 2/1949 | Richardson | 33/98 |
| 2,720,706 | 10/1955 | Laine | 33/DIG. 9 |
| 3,486,232 | 12/1969 | Klawberg | 33/1 SB |

*Primary Examiner*—Willis Little
*Attorney, Agent, or Firm*—Burd, Bartz & Gutenkauf

[57] ABSTRACT

A jig for the accurate and precise measurement of rigid sheet material for making panels for geodesic dome structures. The jig is intended for use in the assembly of geodesic domes of the type having a plurality of generally flat polygonal hub plates and interconnecting struts, each hub having a recessed panel-receiving rabbet in at least some of its edges and each strut having a recessed panel-receiving rabbet in its outer edges. The jig comprises three shoes, each adapted to engage the recessed rabbets of adjacent hubs of an assembled dome which, with their associated struts, define a triangular opening into which a panel is seated to enclose the dome. Each shoe has a length which is the same as the longitudinal back wall of the hub rabbet. The shoes are connected by three elongated bars, each extending between two of the shoes and adjustably fastened thereto. In use, the jig is positioned in a triangular opening with each of the shoes in tight engagement with one of the hub rabbets, and with the interconnecting bars paralleling the struts which interconnect the hubs. The fastening members are tightened to lock the jig into a rigid triangular configuration. The jig is then removed from the assembled dome and positioned on a flat sheet of panel-forming material. A straight line connecting the extremities of the shoes defines a generally triangular area precisely conforming to that defined by the hubs and struts.

8 Claims, 6 Drawing Figures

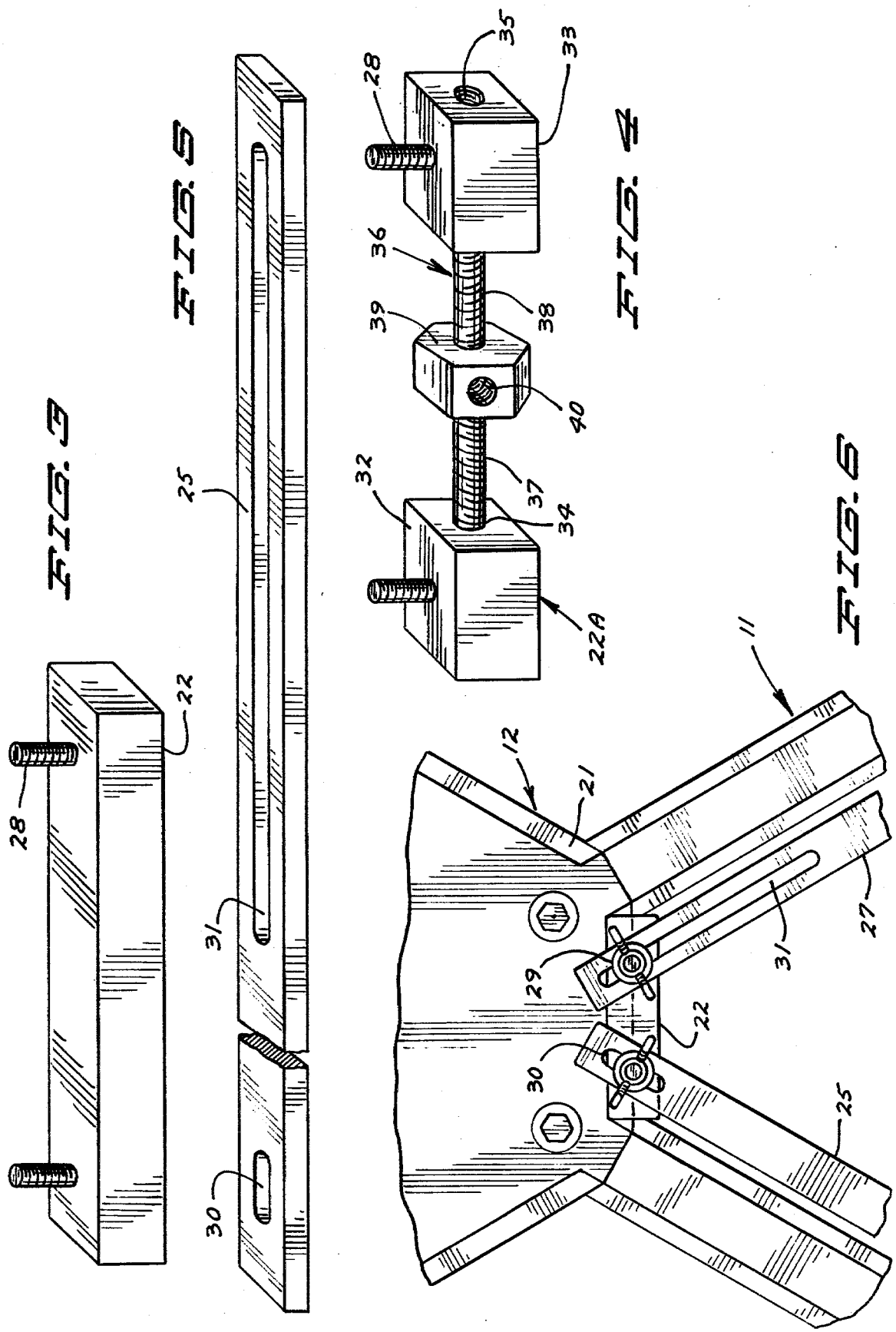

4,187,613

JIG FOR PRECISE MEASUREMENT OF PANELS FOR GEODESIC

This invention is directed to a jig for precisely and accurately measuring triangular panels for a geodesic dome of the type having a plurality of generally flat polygonal hub plates and interconnecting struts, each hub having a recessed panel-receiving rabbet in at least some of its edges and each strut having a recessed panel-receiving rabbet in its outer edges.

In our copending application Ser. No. 905,227, filed May 12, 1978, there is disclosed a simplified hub and strut system for the construction and assembly of geodesic domes. The system is characterized by the outer faces of the hubs and struts being provided with recessed rabbets which function as shoulders for receiving flat nesting panels of transparent or opaque rigid sheet material comprising the outer skin of an assembled dome. The resulting geodesic dome is a generally hemispherical open frame or network defined by a plurality of straight lines intersecting at the hubs.

The struts define a plurality of triangular segments, some of which in turn, in combination, define hexagonal and pentagonal portions. The result is that the frame includes a plurality of triangular openings defining several different triangular shapes. In the assembly of the dome, because of tolerances provided in the structural components, slight variations may exist between triangular segments of the same overall size and configuration. For maximum effectiveness, all panels comprising the outer skin of the dome should fit precisely and tightly. Standardized panels having sufficient tolerance to accommodate the normal variations encountered in assembly of the dome, while fitting tightly in some openings, fit loosely in others. The jig of the present invention overcomes these problems.

Broadly stated, the jig according to the present invention comprises three block-like shoes adapted to engage the recessed rabbets of adjacent hubs of an assembled dome. Each shoe has a straight edge engageable with the longitudinal side wall of one of those rabbets. The length of the straight edge is the same as the length of the rabbet side wall. Each shoe has a flat surface engageable with the face of the hub rabbet. The shoe is of a thickness at least equal to the depth of the rabbet and is provided with a fastener-receiving aperture in its top surface adjacent each end. The shoes are interconnected by three elongated bars, each extending between two of the shoes. Each bar has a length at least equal to the distance between adjacent dome hubs and has a longitudinal fastener-receiving slot adjacent each end. A fastening member is fitted in the aperture at each end of each shoe and passes through a slot in one of the bars to secure the jig members together and permit them to be maintained in a rigid configuration. Because the lengths of the rabbets in the hubs vary, either a plurality of shoes of corresponding varying lengths may be provided or, preferably, each shoe is of adjustable length.

The invention is further illustrated in the accompanying drawings in which corresponding parts are identified by the same numerals and in which:

FIG. 3 is an isometric view of a one-piece shoe;

FIG. 4 is an isometric view of an adjustable shoe;

FIG. 5 is an isometric view of an interconnecting bar; and

FIG. 6 is a fragmentary top plan view showing the manner in which the jig is used in an assembled geodesic dome.

Figure 1:
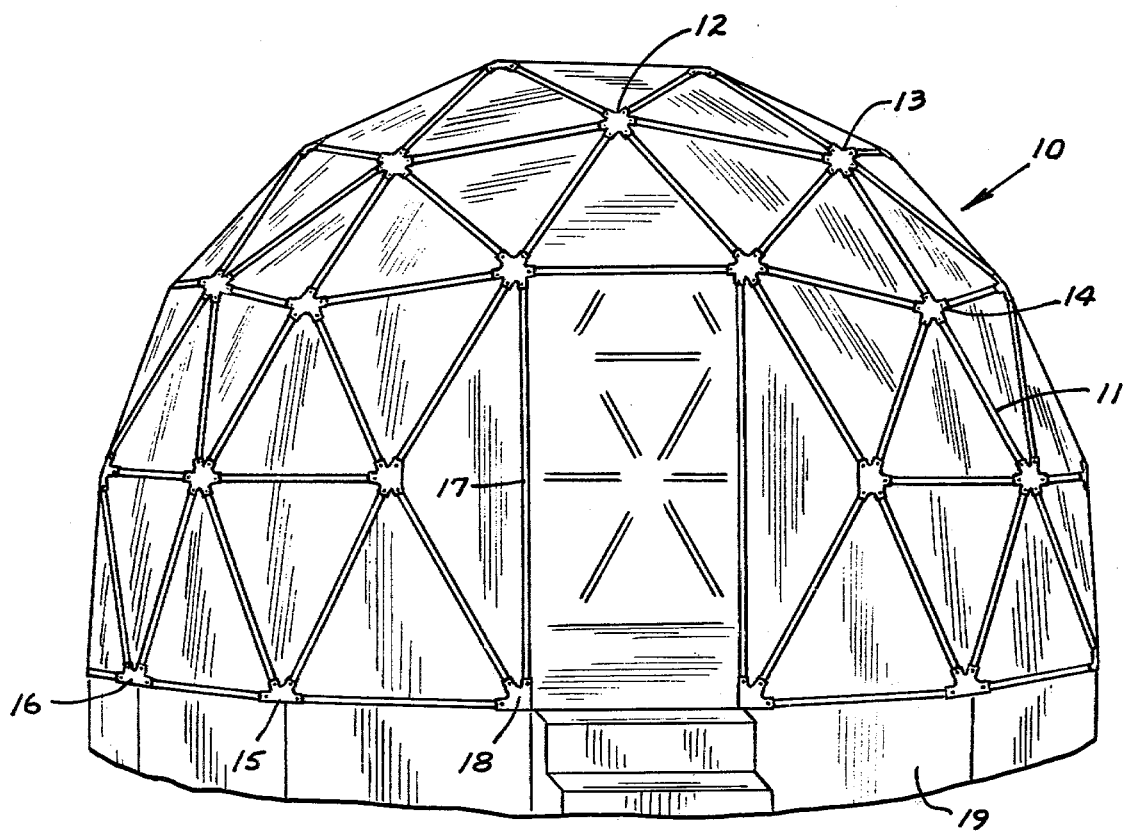
FIG. 1 is a perspective view of a geodesic dome of the type with which the jig of the present invention is used.
Figure 2:
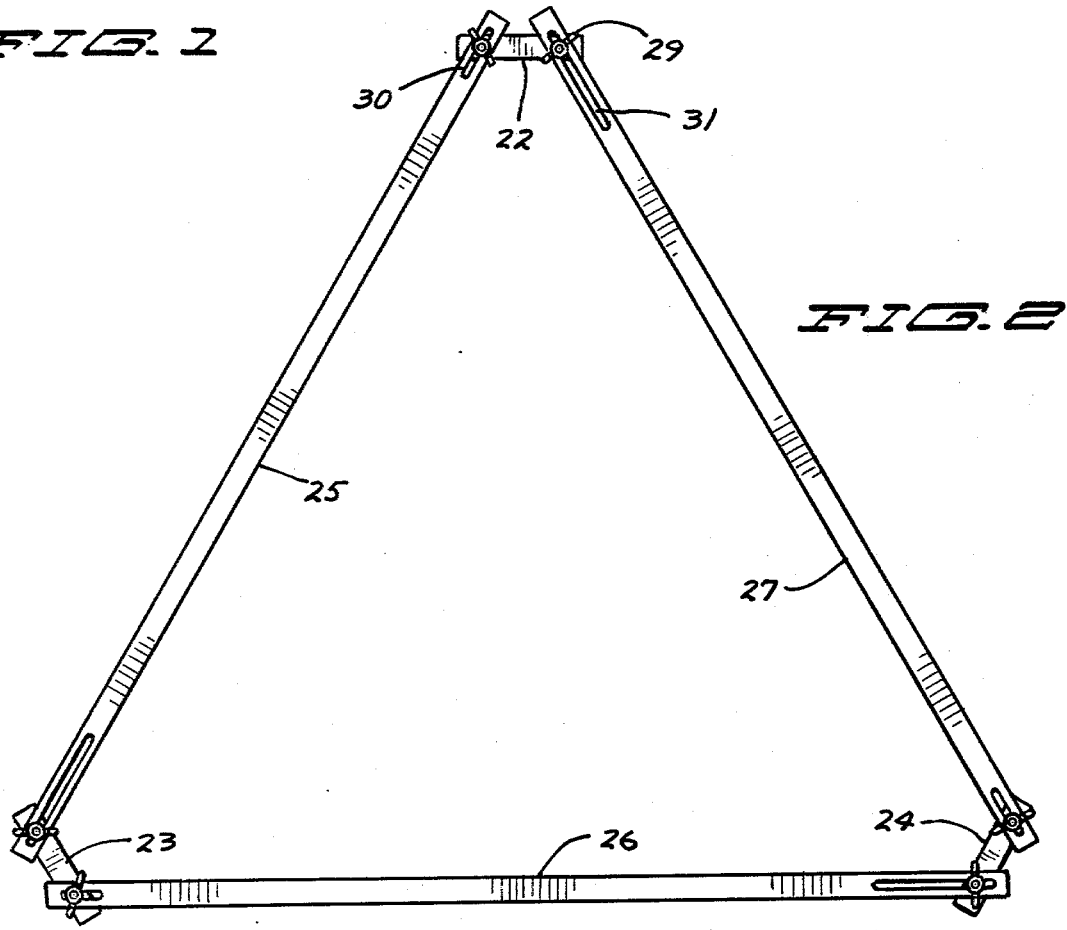
FIG. 2 is a top plan view of a jig according to the present invention.

Referring now to the drawings, there is shown in FIG. 1 a typical geodesic dome structure of the type adapted to be constructed utilizing the hub and strut system according to our copending application Ser. No. 905,227. Although generally hemispherical, the illustrated dome represents approximately ⅝ of a spherical icosahedron. For maximum utilization of the enclosed floor space, the dome comprises a hemisphere plus an added course of components defining a generally vertical wall raising the hemispherical dome portion above the foundation or other base surface.

The dome, indicated generally at 10, is composed of a plurality of elongated struts 11 whose ends come together at one of several different forms of hub or gusset plate 12 through 16. The result then is a generally hemispherical network or frame structure defined by a plurality of straight lines and, when covered, planar surfaces. The struts define a plurality of triangular segments, some of which in turn, in combination, define hexagonal and pentagonal portions. For example, the triangular segments clustered around hubs 12 and 13 define hexagonal areas. Those clustered about hubs 14 define pentagonal areas, with some triangular segments lying both within a hexagonal and pentagonal area. Those struts clustered about the base or foundation hubs 15 and 16 define semi-hexagonal areas. Door frame members 17 connect to hubs 18 which are modified forms of base hubs 16, to define the door opening. As shown, the dome is supported on a raised foundation 19, but it may be constructed on any flat surface.

Each strut 11 is elongated and of generally rectangular cross section. As best seen in FIG. 6, a rabbet 20 is recessed into each of the opposite edges of the outer strut face. This functions as a supporting shoulder upon which to seat rigid panels of flat sheet material for forming the outer skin of a completed dome. Each hub is in the form of a generally flat, relatively thick plate. Hub 12 is in the general configuration of a symmetrical hexagon. It has a plurality of spaced apart rabbets 21 recessed into the polygonal edges. Rabbets 21 function along with the corresponding rabbets 20 of the struts to form a shoulder upon which to seat the rigid panels forming the outer dome skin.

The jig of the present invention is for the purpose of precisely measuring the panels which occupy the triangular space defined by any adjacent trio of hubs and struts seated in the recessed rabbets of the hubs and struts. The jig comprises three shoes 22–24 interconnected by three bars 25–27. In one form, as best seen in FIG. 3, each shoe may be of fixed length generally in the form of a right rectangular block. Adjacent each end, each shoe is provided with an externally threaded fastening member 28 extending vertically from the top surface of the shoe. Each fastening member 28 is preferably fit into an internally threaded hole tapped in the top shoe surface and extends from the top shoe surface sufficiently to extend through an opening in one of bars 25–27 and receive a tightening fastening member, such as a wing nut 29. Alternatively, a bolt may be substituted for the fastening member 28, the bolt head preferably being recessed into the bottom surface of the shoe and adhesively or otherwise secured in the shoe.

Each shoe has a straight edge, here the rear wall surface of the block forming shoe 22. Each shoe is adapted to fit into a recess of one of the hubs. The length of the straight edge is the same as the length of the abutting longitudinal side or rear wall of the recessed rabbet into which the shoe is fitted. Because of the variations in the lengths of the hub rabbets in an assembled dome, if the shoe is of fixed length, then several shoes of varying length must be provided to permit measurement of all of the dome panels. For example, in the case of a 24 foot diameter dome, two bars of 3¾ inch length, three bars of 4⅛ inch length, one bar of 5 inch length and two bars of 6⅛ inch length are provided.

An adjustable form of shoe is shown in FIG. 4. This alternative form of shoe 22A comprises a pair of right rectangular blocks 32 and 33 each provided with a threaded fastening member 28 as previously described in connection with the fixed length shoe. Block 32 is provided with a central longitudinal aperture 34 internally threaded in one direction. Block 33 is provided with a corresponding longitudinally extending aperture 35 internally threaded in the opposite direction. Blocks 32 and 33 are interconnected by a longitudinal rod 36 whose end 37 is threaded in one direction to engage aperture 34 and whose opposite end 38 is threaded in the opposite direction to engage aperture 35. Thus, it will be seen that as rod 36 is rotated in one direction, blocks 32 and 33 will come closer together and as the rod is rotated in the opposite direction, they will be spread farther apart.

To facilitate rotation of the rod, a fixed central body 39 is affixed thereto. Body 29 may be hexagonal, for example, to facilitate rotation of rod 36 with a wrench. Alternatively, body 39 may be provided with one or more radial apertures 40 into which a pin or similar means may be inserted to rotate the body. This form of shoe has an interrupted straight edge adapted to engage the longitudinal wall of the recessed rabbet in the dome hubs. Because of the means for adjustment, the length of the straight edge may be varied to coincide with that of the appropriate hub rabbet into which it is fit for measurement of a panel.

Each bar 25-27 is rigid, relatively flat, of a length somewhat in excess of the length of each strut interconnecting adjacent hubs in an assembled dome. The sole function of bars 25-27 is to hold shoes 22-24 rigidly spaced apart in the proper triangular configuration. To permit spacing of the shoes corresponding to the varying lengths of triangular dome panels, each bar is provided with an aperture 30 adjacent one end, preferably in the form of a short slot, and an aperture 31 in the form of an elongated slot adjacent the opposite end of the bar. Each aperture is adapted to receive one of the threaded fastening members 28 of adjacent shoes. To permit easy adjustment of the jig, the bars and shoes are assembled so that the short slot of one bar engages the fastening means at one end of a shoe and the longer slot of the next adjacent bar engages the fastening member at the opposite end of the same shoe. Variations in strut length are less pronounced than those of hub rabbets. Accordingly, it is not necessary to provide bars of varying length except in the instance of extreme variation in strut length, as in the case of door posts 17.

As best seen in FIG. 6, in order to accurately measure a triangular panel to fit a particular frame opening in the geodesic dome, the jig is positioned with each shoe in tight engagement with the longitudinal side wall and face of the rabbet of three adjacent hubs of an assembled dome frame. As seen in FIG. 6, shoe 22 is fit into a rabbet 21 of hub 12. The other shoes are similarly positioned in the rabbets of other adjacent hubs. Bars 25-27 parallel the struts interconnecting the hubs. With the three shoes in engagement with the hub rabbets, the fastening members are tightened to lock the jig in its rigid triangular configuration. The jig is then removed from the assembled dome and is positioned on a flat sheet of panel-forming material such as plywood, plexiglass, chipboard, or the like. The ends of the straight edges of each shoe define the limits of the recess into which the panel is to be seated. Accordingly, lines are inscribed with a straight edge connecting the extremities of the straight edges of the jig shoes. Then, when the panel is cut along these lines, it will fit precisely in the frame opening in which the jig measurement was taken. Although the panels are described as "triangles" in each instance, in reality they are generally triangular planes with truncated apices.

The panel measuring jig permits the geodesic dome frame members, the hubs and struts, to be compactly packaged and shipped to the construction site. The panel-forming sheet material can then be procured locally and cut to size and shape at the construction site.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A jig of accurately measuring triangular panels for a geodesic dome of the type having a plurality of generally flat polygonal hub plates and interconnecting struts, each hub having a recessed panel-receiving rabbet in at least some of its edges and each strut having a recessed panel-receiving rabbet in its outer edges, said jig comprising:
   (A) three shoes adapted to engage the recessed rabbets of adjacent hubs of an assembled dome, each shoe having:
      (1) a straight edge engageable with the longitudinal side wall of one of said hub rabbets, the length of said straight edge being the same as the length of said rabbet side wall,
      (2) a flat surface engageable with the face of said rabbet,
      (3) a thickness at least equal to the depth of said rabbet, and
      (4) a fastener-receiving aperture adjacent each end,
   (B) three elongated bars each extending between two of said shoes, each bar having:
      (1) a length at least equal to the distance between adjacent dome hubs, and
      (2) a fastener-receiving aperture adjacent each end, and
   (C) six adjustable fastening members, each extending through the aperture adjacent the end of a shoe and through the aperture at one end of a bar, and adapted to rigidly secure said shoes and bars together.

2. A jig according to claim 1 wherein each of said shoes is a right rectangular block of fixed length.

3. A jig according to claim 1 wherein each of said shoes is of adjustable length, being composed of a pair of spaced apart shoe members and interconnecting adjustable fastening means.

4. A jig according to claim 3 wherein each of said shoes is comprised of:

(A) a pair of block members, each having a longitudinal central aperture internally and oppositely threaded, and (B) a rotatable rod in said apertures, the ends of said rod being externally and oppositely threaded.

5. A jig according to claim 1 wherein the apertures in the ends of the shoes are internally threaded and each of said fastening members is an externally threaded rod having a nut thereon.

6. A jig according to claim 5 wherein said nut is a wing nut.

7. A jig according to claim 1 wherein each of said bars has a relatively short slot adjacent one end and a relatively longer slot adjacent the opposite end, said jig being assembled so that the shorter slot of one bar engages the fastening member of one shoe and the longer slot of the next adjacent bar engages the other fastening member of the same shoe.

8. A method for accurately measuring triangular panels for a geodesic dome of the type having a plurality of generally flat polygonal hub plates and interconnecting struts, each hub having a recessed panel-receiving rabbet in at least some of its edges and each strut having a recessed panel-receiving rabbet in its outer edges, said method comprising:

(A) positioning a jig comprising:

(1) three shoes adapted to engage the recessed rabbets of adjacent hubs of an assembled dome, each shoe having:

(a) a straight edge engageable with the longitudinal side wall of one of said hub rabbets, the length of said straight edge being the same as the length of said rabbet side wall, (b) a flat surface engageable with the face of said rabbet, (c) a thickness at least equal to the depth of said rabbet, and (d) a fastener-receiving aperture adjacent each end, (2) three elongated bars each extending between two of said shoes, each bar having:

(a) a length at least equal to the distance between adjacent dome hubs, and (b) a fastener-receiving aperture adjacent each end, and (3) six adjustable fastening members, each extending through the aperture adjacent the end of a shoe and through the aperture at one end of a bar, and adapted to rigidly secure said shoes and bars together, with each of said shoes in tight engagement with the longitudinal side wall and face of the rabbet of one of three adjacent hubs of an assembled dome, and with said bars paralleling the struts interconnecting those hubs, (B) tightening said fastening members to lock the jig in a rigid triangular configuration, (C) removing said jig from the assembled dome and positioning on a flat sheet of panel-forming material, and (D) with a straight edge inscribing lines connecting the extremities of the straight edges of the jig shoes.

* * * * *

UNITED STATES PATENT AND TRADEMARK OFFICE
CERTIFICATE OF CORRECTION

PATENT NO. : 4,187,613
DATED : February 12, 1980
INVENTOR(S) : Robert P. Ivers et al It is certified that error appears in the above-identified patent and that said Letters Patent are hereby corrected as shown below:

On the title page, in the title, after "GEODESIC", --DOMES-- is omitted.

Column 3, line 33, "29" should be --39--.

Column 4, line 35, "of" should be --for--.

Signed and Sealed this

Twentieth Day of May 1980

[SEAL]

Attest:

SIDNEY A. DIAMOND

Attesting Officer

Commissioner of Patents and Trademarks